(12) United States Patent
Dietz et al.

(10) Patent No.: US 9,372,553 B2
(45) Date of Patent: Jun. 21, 2016

(54) DIRECTIONAL FORCE SENSING FOR STYLI

(75) Inventors: Paul Henry Dietz, Redmond, WA (US); Tristan Thomas Trutna, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 896 days.

(21) Appl. No.: 13/545,671

(22) Filed: Jul. 10, 2012

(65) Prior Publication Data
US 2014/0019070 A1   Jan. 16, 2014

(51) Int. Cl.
*G01L 1/00*   (2006.01)
*G06F 19/00*   (2011.01)
*G06F 3/0354*   (2013.01)

(52) U.S. Cl.
CPC ................................. *G06F 3/03545* (2013.01)

(58) Field of Classification Search
CPC ..... G06F 19/00; G06F 3/03545; G06F 3/044; G01L 1/04; G01L 1/14; G01L 1/20; G01L 1/00
USPC ........... 702/41; 73/862.381, 862.621, 862.68; 345/173, 179; 178/18.06, 19.03
See application file for complete search history.

(56) References Cited

U.S. PATENT DOCUMENTS

| | | | | |
|---|---|---|---|---|
| 5,548,092 | A * | 8/1996 | Shriver | G06F 3/03545 178/19.01 |
| 5,565,632 | A * | 10/1996 | Ogawa | G06F 3/03545 73/862.041 |
| 5,940,066 | A * | 8/1999 | Weinblatt | G06F 3/0355 345/179 |
| 5,981,883 | A | 11/1999 | Shriver | |
| 6,324,920 | B1 | 12/2001 | DeSchrijver | |
| 6,483,499 | B1 | 11/2002 | Li | |
| 2002/0175836 | A1 | 11/2002 | Roberts | |
| 2006/0001654 | A1 | 1/2006 | Smits | |
| 2009/0044640 | A1 * | 2/2009 | Vassilev | B43K 8/22 73/862.541 |
| 2010/0006350 | A1 | 1/2010 | Elias | |
| 2010/0271325 | A1 | 10/2010 | Conte | |
| 2011/0012869 | A1 | 1/2011 | Klinghult | |
| 2011/0051334 | A1 | 3/2011 | Griffith | |
| 2011/0298709 | A1 * | 12/2011 | Vaganov | G06F 3/03546 345/158 |
| 2012/0206387 | A1 * | 8/2012 | Omura | G06F 3/03545 345/173 |
| 2012/0253699 | A1 * | 10/2012 | Kuno | 702/41 |
| 2014/0165742 | A1 * | 6/2014 | Fergusson | G06F 3/03545 73/862.68 |

FOREIGN PATENT DOCUMENTS

JP   S63-44222 A   2/1988

OTHER PUBLICATIONS

"International Search Report & Written Opinion for PCT Patent Application No. PCT/US2013/049810", Mailed Date: Dec. 13, 2013, Filed Date: Jul. 9, 2013, 12 Pages.
Scott, J., L. M. Brown, M. Molloy, Mobile device interaction with force sensing, Proc. of the 7th Int'l Conf. on Pervasive Computing, Pervasive 2009, May 11-14, 2009, pp. 133-150, Nara, Japan.

* cited by examiner

*Primary Examiner* — Mischita Henson
*Assistant Examiner* — Ruihua Zhang
(74) *Attorney, Agent, or Firm* — Steve Wight; Cassandra T. Swain; Micky Minhas (57) ABSTRACT

The stylus directional force sensing technique described herein employs a directional tip sensor which measures the magnitude and direction of force applied to a stylus tip. This information is then used to control the behavior of the stylus in an application. In one embodiment, this simple design only measures the stylus angle when the tip is actually pressing on the surface. This has the added benefit of reducing power requirements and computational complexity.

20 Claims, 6 Drawing Sheets

DIRECTIONAL FORCE SENSING FOR STYLI

BACKGROUND

Styli are often used as human input output devices for computers and other electronic devices and are meant to mimic the behavior of pens, pencils, brushes and other familiar writing instruments. Styli are typically used to make markings on touch screen surfaces or specially instrumented surfaces that can detect the pressure of a stylus on the surface or in other ways determine its location.

When using real pens, pencils and brushes, users will often vary pressure and angle to achieve interesting effects. A good example of this is calligraphy, where variation of the angle the nib of the pen makes with the paper creates different line widths and curves. Similarly, the angle a brush is held on a canvas determines if the brush strokes are wide or narrow. Ideally, styli should mimic this behavior of their non-electronic counterparts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the stylus directional force sensing technique described herein employs a directional tip sensor which measures the magnitude and direction of force applied to a stylus tip relative to a surface, such as, for example a touch screen or even a non-touch sensitive surface. The magnitude and direction of force applied to the stylus tip is then used to control the output behavior of the stylus in an application on a computing device. In one embodiment, this simple design only measures stylus angle when the tip is actually pressing on the surface. This has the added benefit of reducing power requirements and increasing computational efficiency. In another embodiment of the stylus directional force sensing technique the rotation of the stylus tip is also measured.

More specifically, in one exemplary embodiment of the stylus directional force sensing technique, the stylus tip is mounted to a floating plate, which is connected to a second plate via three force sensors. The second plate is firmly mounted to the body of the stylus. In this embodiment, the total force applied to the surface is measured by a force sensor in the tip of the stylus. Angular forces on the stylus from the surface can be determined by using the relative values from the three sensors that are attached to the two plates. The rotation of the stylus can also be determined using all four sensors. The sensors can be, for example, elastomeric force sensors, capacitive force sensors, or force sensitive resistors. However, other technologies may be used to measure the forces on the stylus tip and to determine its angle relative to the surface. In some embodiments displacement sensors are utilized to measure the forces.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the stylus directional force sensing technique, reference is made to the accompanying drawings, which form a part thereof, and which show by way of illustration examples by which the stylus directional force sensing technique described herein may be practiced. It is to be understood that other embodiments may be utilized and structural changes may be made without departing from the scope of the claimed subject matter.

1.0 Stylus Directional Force Sensing Technique

The following sections provide an overview of the stylus directional force sensing technique, directional tip sensor designs, as well as an exemplary process and exemplary architectures for practicing the technique. Details of various embodiments of the stylus directional force sensing technique are also provided.

1.1 Overview of the Technique

Styli are often used as human input output devices for computing devices and are meant to mimic the behavior of pens, pencils, brushes and other familiar writing instruments. When using actual writing instruments, as opposed to computer styli, users will often vary pressure and angle to the stylus to achieve interesting effects. A good example of this is calligraphy.

Most existing systems for determining stylus location and pressure use a capacitive digitizer that functions only at the surface and therefore cannot determine the angle of the stylus with respect to the surface. To emulate the results of the varied pressure, some standard computer styli include pressure sensors, and some incorporate a system to obtain some angular sensitivity. In some existing stylus systems, pressure and angular sensitivity are measured using two separate sensing mechanisms. One system typically includes a pressure sensitive tip. The second system is a separate position system which determines angle relative to the writing surface by using electromagnetic resonance. This two part system for measuring pressure on the stylus and angle of the stylus is a cumbersome and expensive solution for determining the pressure and angular direction of the stylus relative to the surface.

The stylus directional force sensing technique described herein pertains to a method for providing directional force sensing for styli. The stylus directional force sensing technique provides a directional tip sensor which measures magnitude and direction of force applied to a stylus tip to control the behavior of the stylus in an application. Various sensor designs can be used to capture different aspects of the position of the stylus, as well as the pressure it applies to the surface and its rotation.

1.1.2 Directional Tip Sensor Design

The stylus directional force sensing technique described herein employs a directional tip sensor that measures the force and direction of the stylus tip. The directional tip sensor can employ various numbers of force sensors or displacement sensors in order to measure the forces on the stylus. Some exemplary designs for the directional tip sensor are discussed in the paragraphs below.

1.1.2.1 Four Sensor Directional Tip Sensor Design

Figure 1:
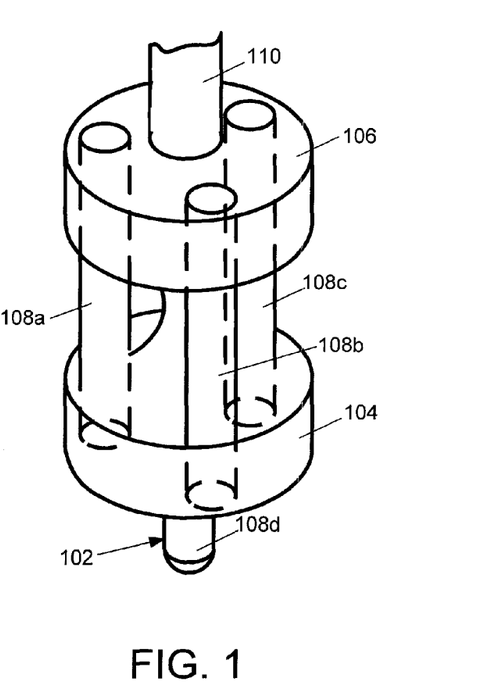
FIG. 1 depicts a three dimensional diagram of one exemplary directional tip sensor employed by the stylus directional force sensing technique.

One exemplary directional tip sensor 100 employed in the stylus directional force sensing technique is shown in FIG. 1. In this embodiment, the tip of a stylus 102 is mounted to a first floating plate 104. The first plate 104 is connected to a second plate 106 firmly mounted to the body of the stylus 110. Three of the sensors 108a, 108b, 108c are mounted to the floating plates 104, 106, and the fourth sensor 108d is mounted in the tip of the stylus 102. The sensors 108a, 108b, 108c allow the plates 104 and 106 to "float" or move relative to each other. The sensors can be of various configurations. For example, the sensors can be displacement sensors. Alternately, the sensors could be force sensors, such as, for example, elastomeric force sensors, capacitive force sensors or force sensitive resistors.

Figure 2:
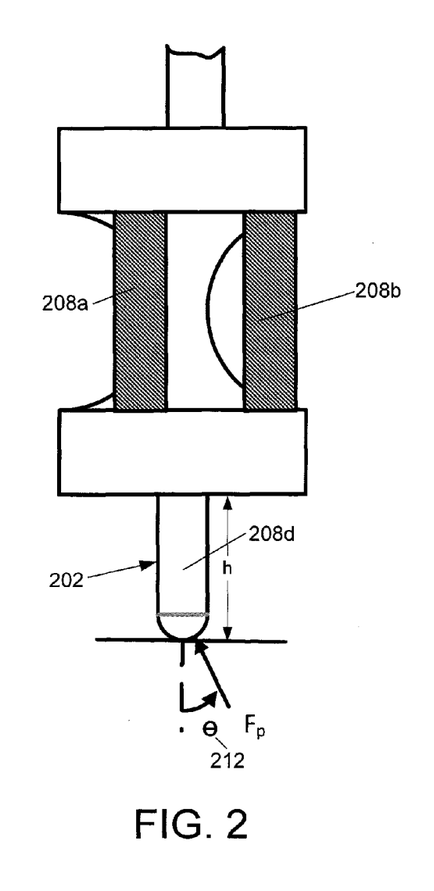
FIG. 2 depicts a side view of the directional tip sensor shown in FIG. 1.

As shown in FIG. 2, for the directional tip sensor configuration shown in FIG. 1, the total force $F_p$ applied to the stylus tip 202 relative to the surface 210 can be measured directly with sensor 208d. The angular direction 212, $\theta$, of the force applied to the stylus tip 202 relative to the surface 210 is determined from the relative values of the sensors 208a, 208b, 208c (not shown) and the force $F_p$. For example, given the directional tip sensor shown in FIG. 1 and FIG. 2, the angular direction $\theta$ of the force, can be calculated as follows:

$$F_p \cos(\theta) = F_{S1} + F_{S2} + F_{S3} \quad \text{(equation 1)}$$

$$\theta = \cos^{-1}\left(\frac{F_{S1} + F_{S2} + F_{S3}}{F_p}\right) \quad \text{(equation 2)}$$

$$F_p \sin(\theta) h = \quad \text{(equation 3)}$$
$$-F_{S1}\cos(\phi)r + F_{S2}\cos\left(\phi + \frac{2}{3}\pi\right)r + F_{S3}\cos\left(\phi + \frac{4}{3}\pi\right)r$$

In the above example, the first two equations solve for the angle of the stylus tip with respect to the surface 210. $F_p$ represents the total force on the stylus tip and the $F_S$ values are the forces measured at each sensor 208a, 208b, 208c. These equations represent that there is a portion of the pen force that goes to rotating the tip so that it ends up being at an angle $\theta$ relative to the surface. This angle $\theta$ can be determined as an inverse cosine function of the four force sensor readings as shown in equation 2. The variable h represents the distance from the stylus tip to the first plate.

Figure 3:
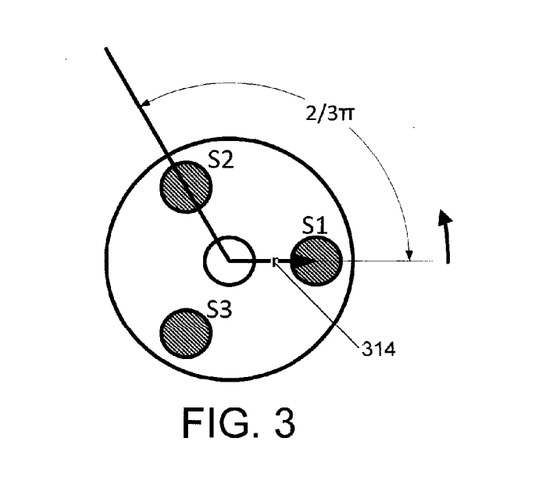
FIG. 3 depicts a top view of the directional tip sensor shown in FIG. 1.

The third equation uses the four force sensors and the angle $\theta$ (that was solved for in the first two equations) to determine the "rotational position" $\Phi$ of the stylus. That is to say, if one imagines having a pocket clip on the stylus, one can tell if that clip is up or down or rotated to any angle. As can be seen in FIG. 3, the angle of rotation of the stylus or rotational position is related to the radius r 314, from the center of the stylus to the center of a given sensor and the angular spacing of the sensors equilaterally disposed around a given plate.

Once the direction of force applied to the stylus tip, the direction of force applied to the stylus tip, and the rotation of the stylus tip have been determined, this information can be used to determine the output of the stylus. For example, the determined direction and magnitude of the force applied to the stylus, as well as the rotation of the stylus, can be sent to a computing device which can use this information to create special effects with the stylus such as, for example, creating wider and thinner lines on a display device as would be created in traditional calligraphy using a traditional calligraphy stylus.

In one embodiment of the stylus directional force sensing technique, the total force is measured only when the stylus tip is pressing on the surface. Likewise, in one embodiment of the technique, the direction of the force is measured only when the stylus tip is pressing on the surface.

1.2.1.2 Two Sensor Directional Tip Sensor Design

One embodiment of the stylus directional force sensing technique uses a reduced number of sensors, thereby reducing its cost of manufacture and computational complexity. However, this embodiment does not resolve the rotational position of the stylus. In this embodiment the sensors that measure $F_{S1}$, $F_{S2}$ and $F_{S3}$ shown in FIGS. 1 and 2 are replaced with a single force sensor, $F_s$. For example, this embodiment of the stylus directional force sensing technique has one sensor at the tip of the stylus and one sensor inside the body of the pen located behind the hour-glass looking part. This embodiment can solve for pen rotation but not pen/stylus angle with respect to the surface. In this embodiment, Eqns 1 and 2 are still valid, and $F_p$ remains the same and $F_s$ replaces $F_{S1} + F_{S2} + F_{S3}$.

1.2.1.3 Three Sensor Directional Tip Sensor Design

Figure 4:
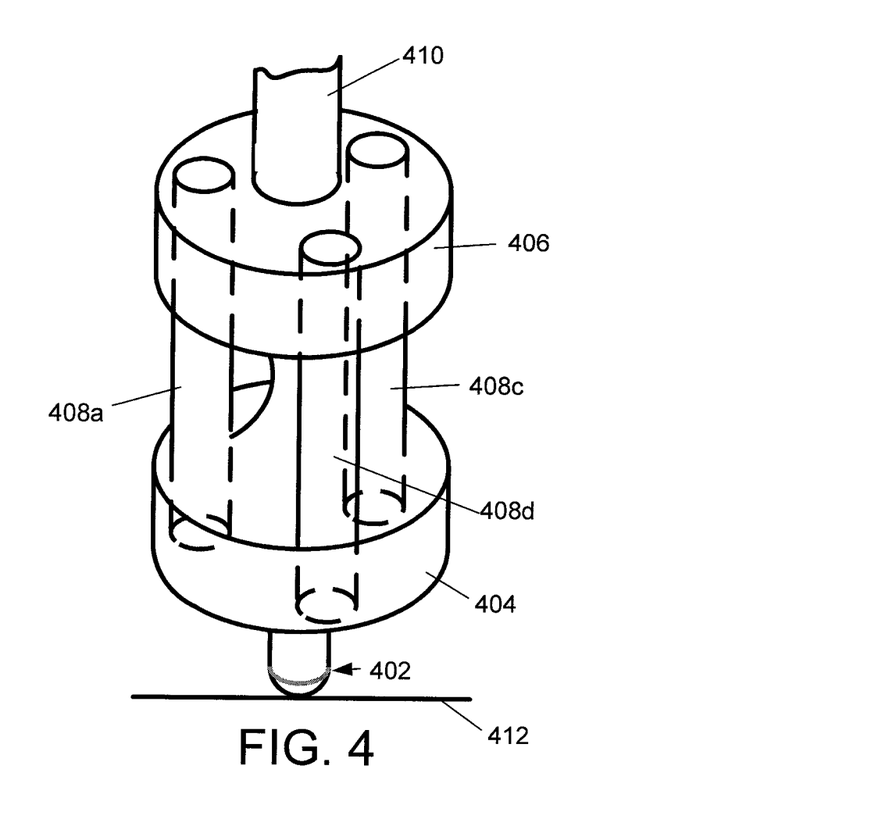
FIG. 4 depicts another directional tip sensor where three force/displacement sensors are employed with the stylus directional force sensing technique.

One exemplary directional tip sensor 400, that uses three force sensors, is shown in FIG. 4. As shown in FIG. 4, the tip of a stylus 402 is mounted to a first floating plate 404. The first plate 404 is connected to a second plate 406 firmly mounted to the body of the stylus 410. Three sensors 408a, 408b, and 408c floatingly connect the first plate to the second plate 406. In this embodiment these sensors measure shear and normal forces. In this embodiment there is no force sensor inside the stylus tip. As discussed previously, the sensors can be displacement sensors or force sensors, such as, for example, elastomeric force sensors, capacitive force sensors or the force sensors could be force sensitive resistors.

For the sensor configuration shown in FIG. 4, the total force applied to the stylus tip 402 relative to the surface 410 $F_p$ 404 can be computed as the sum of the measurements of the sensors 408a, 408b and 408c. The rotational position, $\phi$, of the force applied to the stylus tip 402 relative to the surface 412 is determined from the relative values of the sensors 408a, 408b, 408c. This sensor information will allow for the computation of the total force on the tip of the stylus and the angle of rotation or rotational position of the stylus, but cannot provide the direction of the force applied.

Once the direction of force applied to the stylus tip and the direction of force applied to the stylus tip have been determined, this information can be used to control the output of the stylus. For example, the determined direction and magnitude of the force applied to the stylus can be sent to an application which can use this information to create special effects with the stylus such as creating wider and thinner lines as would be created in traditional calligraphy using a traditional calligraphy stylus.

The following section provides a description of an exemplary process for practicing the technique.

1.2 Exemplary Process

Figure 5:
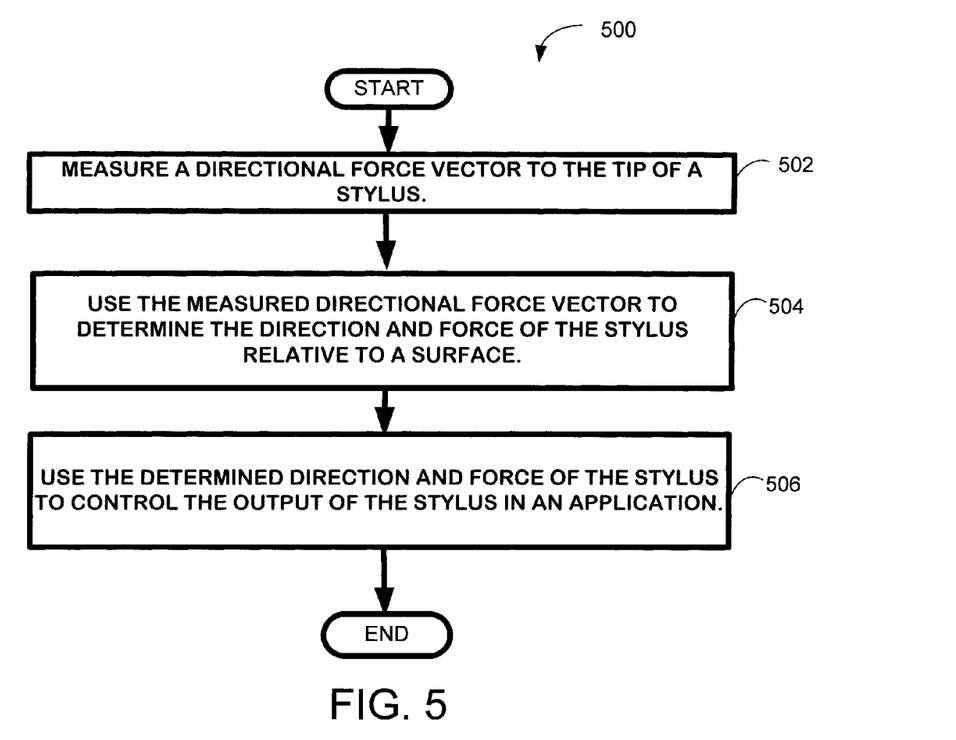
FIG. 5 depicts a flow diagram of an exemplary process for practicing the stylus directional force sensing technique.

FIG. 5 depicts one exemplary computer-implemented process 500 for determining the magnitude and direction of force applied to a stylus tip to control the behavior of the stylus in a computer application according to stylus directional force sensing technique. As shown in FIG. 5, block 502, the stylus directional force sensing technique measures a directional force vector to the tip of the stylus. For example, the directional force vector can be measured using two or more sensors, such as, for example, elastomeric force sensors, capacitive force sensors, force sensitive resistors, or other technologies may be used.

As shown in block 504, the technique then uses the measured directional force vector to determine the direction and force of the stylus relative to the surface. For example, the total force applied to the stylus tip relative to the surface can be determined as the sum of the forces measured from two or more force sensors measuring the total force to the tip of the stylus. Likewise, the angle of the stylus relative to the surface can be determined using the relative values of forces measured from two or more force sensors simultaneously measuring the force to the tip of the stylus.

Once the direction of force applied to the stylus tip and the direction of force applied to the stylus tip have been determined, this information can be used to control the output of the stylus, as shown in block 506. For example, the determined direction and magnitude of the force applied to the stylus can be used to create special effects with the stylus such as creating wider and thinner lines as would be created in traditional calligraphy using a traditional calligraphy stylus.

In one embodiment of the stylus directional force sensing technique, the magnitude of the total force and the direction of the force are measured only when the stylus tip is pressing on the surface. This has the effect of increasing computational efficiency and of reducing power requirements.

In one embodiment of the stylus directional force sensing technique the directional force vector is also used to determine the rotation of the stylus, for example in the manner described above with respect to FIGS. 1-3.

An exemplary process for practicing the stylus directional force sensing technique having been described, the following section discusses exemplary architectures for practicing the stylus directional force sensing technique.

1.4 Exemplary Architecture

Figure 6:
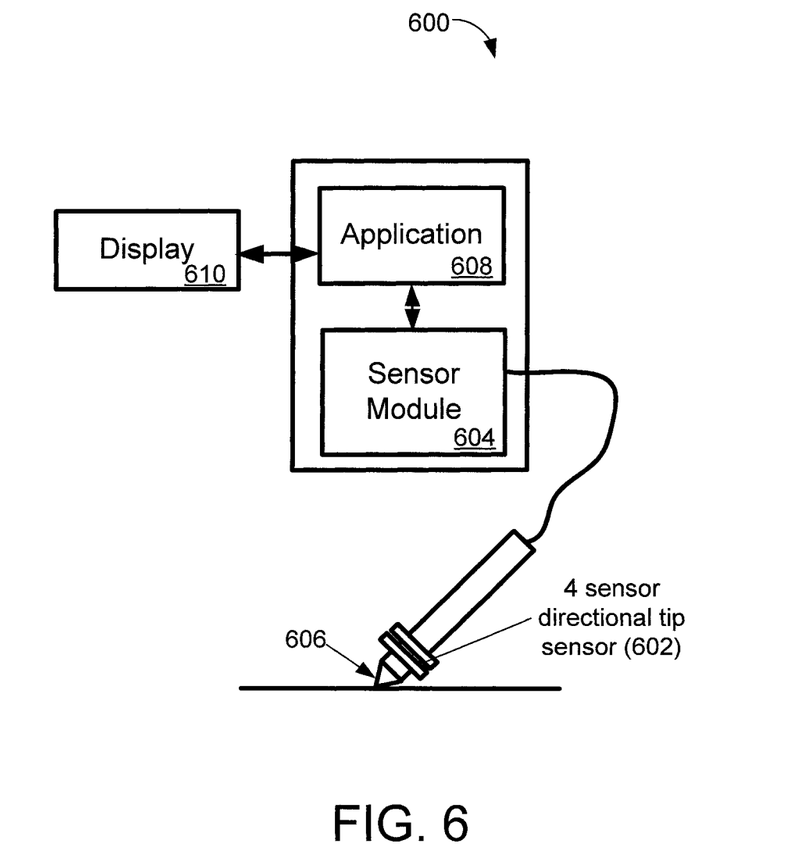
FIG. 6 is an exemplary architecture for practicing one exemplary embodiment of the stylus directional force sensing technique described herein.

FIG. 6 shows an exemplary architecture 600 for practicing one embodiment of the stylus directional force sensing technique. This embodiment employs a four sensor directional tip sensor 602. As shown in FIG. 6, this exemplary architecture 600 includes a sensor module 604 that resides on a general purpose computing device 800 such as will be described in greater detail with respect to FIG. 8. The sensor module 604 measures the magnitude and direction of a force applied to a stylus tip 606 and determines the effects on the output generated by an application 608 based on the stylus input. This output of the stylus can then be displayed on a display 610.

In this embodiment, the architecture 600 employs a direction tip sensor design like the one shown and discussed with respect to FIGS. 1-3. As discussed previously, the tip of a stylus is mounted to a first floating plate. The first plate is connected to a second plate firmly mounted to the body of the stylus via three sensors. A fourth sensor is mounted in the tip of the stylus and measures the total force on the stylus. The measurements from the three sensors mounted to the plates, along with the measurements from the sensor in the tip of the stylus, are used to compute the angle of the stylus relative to the surface and the angle of rotation of the stylus.

More specifically, the sensor module 604 takes the measurements of the sensors and determines the total force applied to the stylus tip relative to the surface, angular direction of the stylus relative to the surface and the rotation of the stylus. The total force applied to the stylus tip, $F_p$, can be measured directly with the sensor in the sensor tip. The angular direction, $\theta$, of the force applied to the stylus tip relative to the surface, as well as the rotation of the stylus body, are determined from the values of all of the sensors as discussed above with the embodiment of FIGS. 1-3.

Once the direction of force applied to the stylus tip, the direction of force applied to the stylus tip, and the rotation of the stylus tip have been determined, this information can be used to control the output of the stylus. For example, the determined direction and magnitude of the force applied to the stylus, as well as the rotation of the stylus, can be sent to the application 608 which can use this information to create special effects with the stylus such as creating wider and thinner lines and curves. This output can then be displayed on a display 610.

Figure 7:
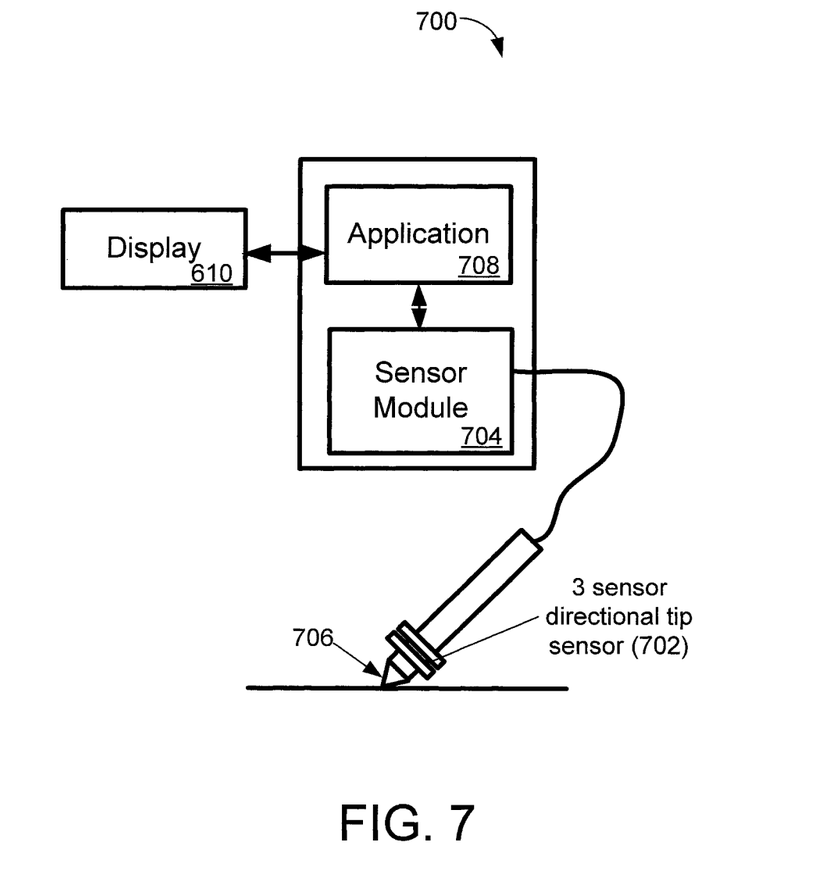
FIG. 7 is another exemplary architecture for practicing another exemplary embodiment of the stylus directional force sensing technique described herein.

FIG. 7 shows another exemplary architecture 700 for employing one embodiment of the stylus directional force sensing technique. This embodiment employs three force sensors in its directional tip sensor 702. As shown in FIG. 7, this exemplary architecture 700 includes a sensor module 704 that resides on a general purpose computing device 800 such as will be described in greater detail with respect to FIG. 8. This sensor module 704 measures the magnitude and direction of a force applied to a stylus tip according to the stylus directional force sensing technique. This architecture 700 employs a directional tip sensor design such as the one shown and discussed with respect to FIG. 4. In this embodiment, the tip of a stylus is mounted to a first floating plate. The first plate is connected to a second plate firmly mounted to the body of the stylus via three sensors (e.g., displacement sensors or force sensors, such as, for example, elastomeric force sensors, capacitive force sensors or the force sensors could be force sensitive resistors).

In this embodiment the total force applied to the stylus tip relative to the surface is determined as the sum of the forces measured from the sensors. The direction of the force applied to the stylus tip relative to the surface is determined from the relative values of the sensors, as discussed previously.

Once the direction of force applied to the stylus tip and the direction of force applied to the stylus tip have been determined, this information can be used to control the stylus. For example, the determined direction and magnitude of the force applied to the stylus can be sent to an application 708 which can use this information to create special effects with the stylus such as creating wider and thinner lines as would be created in traditional calligraphy using a traditional calligraphy stylus. This output can then be displayed on a display 710.

Figure 8:
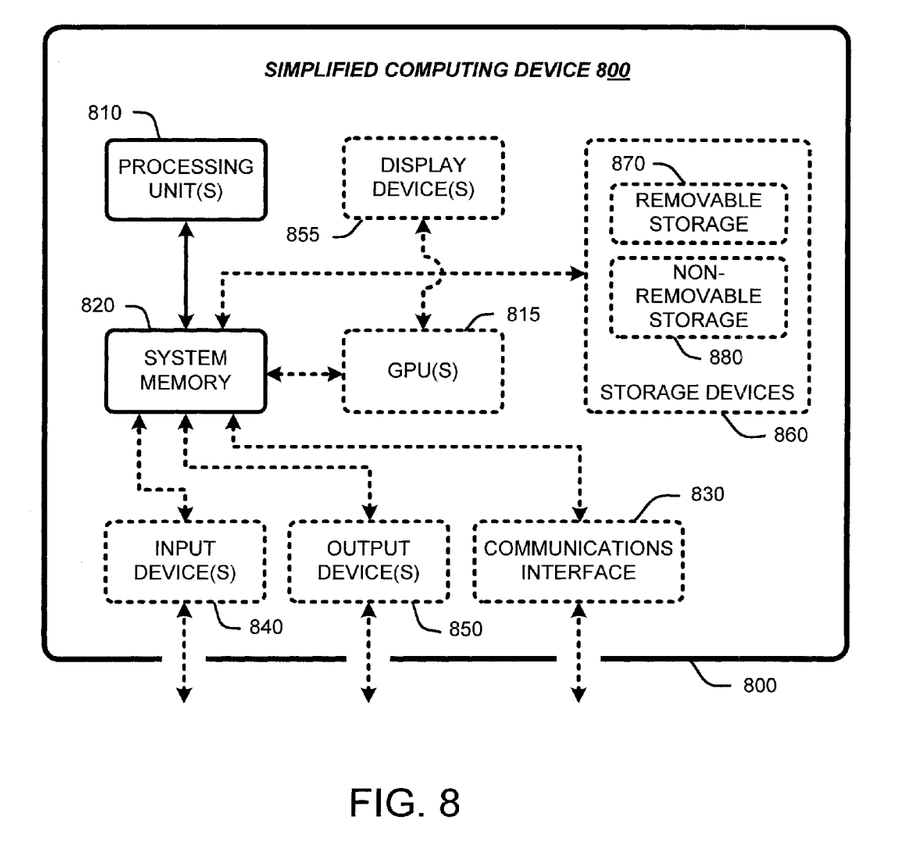
FIG. 8 is a schematic of an exemplary computing environment which can be used to practice the stylus directional force sensing technique.

2.0 Exemplary Operating Environments:

The stylus directional force sensing technique described herein is operational within numerous types of general purpose or special purpose computing system environments or configurations. FIG. 8 illustrates a simplified example of a general-purpose computer system on which various embodiments and elements of the stylus directional force sensing technique, as described herein, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 800. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the stylus directional force sensing technique, the device should have a sufficient computational capability and system memory to enable basic computational operations. In particular, as illustrated by FIG. 8, the computational capability is generally illustrated by one or more processing unit(s) 810, and may also include one or more GPUs 815, either or both in communication with system memory 820. Note that that the processing unit(s) 810 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 8 may also include other components, such as, for example, a communications interface 830. The simplified computing device of FIG. 8 may also include one or more conventional computer input devices 840 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional computer output devices 850 (e.g., display device(s) 855, audio output devices, video output devices, devices for transmitting wired or wireless data transmissions, etc.). Note that typical communications interfaces 830, input devices 840, output devices 850, and storage devices 860 for general-purpose computers are well known to those skilled in the art, and will not be described in detail herein.

The simplified computing device of FIG. 8 may also include a variety of computer readable media. Computer readable media can be any available media that can be accessed by computer 800 via storage devices 860 and includes both volatile and nonvolatile media that is either removable 870 and/or non-removable 680, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the stylus directional force sensing technique described herein, or portions thereof, may be stored, received, transmitted, or read from any desired combination of computer or machine readable media or storage devices and communication media in the form of computer executable instructions or other data structures.

Finally, the stylus directional force sensing technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:
1. A computer-implemented process for determining a stylus's angle and pressure relative to a surface comprising:
   using a computing device for:
   measuring a directional force vector to the tip of the stylus using a first plate mounted to the tip of the stylus, a second plate firmly mounted to the body of the stylus, and two or more force sensors floatingly connecting the first plate to the second plate;
   using the measured directional force vector to determine the direction and force of the stylus relative to the surface; and
   using the determined direction and force of the stylus to control the output of the stylus in an application.

2. The computer-implemented process of claim 1 wherein using the measured directional force vector to determine the force of the stylus relative to the surface, comprises:
   determining the total force applied to the stylus tip relative to the surface as the sum of the forces measured from two or more force sensors measuring the total force to the tip of the stylus.

3. The computer-implemented process of claim 1 wherein using the measured directional force vector to determine the angle of the stylus relative to the surface, comprises:

using the relative values of forces measured from two or more force sensors measuring the force to the tip of the stylus.

4. The computer-implemented process of claim 1 wherein the magnitude of the total force and the direction of the force are measured only when the stylus tip is pressing on the surface.

5. The computer-implemented process of claim 1 wherein the directional force vector is used to determine the rotation of the stylus.

6. A system for measuring the magnitude and direction of a force applied to a stylus tip to a surface, comprising:
   a stylus tip mounted to a first plate;
   a second plate firmly mounted to the body of the stylus;
   three force sensors floatingly connecting the first plate to the second plate; and
   a fourth force sensor mounted inside the tip of the stylus; and
   a sensor module for determining the total force applied to the stylus tip relative to the surface, and the direction of the force applied to the stylus tip relative to the surface from measurements received from the force sensors.

7. The system of claim 6, wherein the sensor module determines the direction of force applied to the stylus tip using measurements from the three force sensors floatingly connected to the first and second plates.

8. The system of claim 6, wherein the sensor module determines the rotation of the stylus tip using measurements from the three force sensors floatingly connected to the first and second plates and the measurements from the force sensor inside the tip of the stylus.

9. The system of claim 6, further comprising an application to use the determined total force and direction of the force applied to the stylus tip to control the output of the stylus.

10. The system of claim 6 wherein the sensors are displacement sensors.

11. The system of claim 6 wherein the sensors are force sensors.

12. The system of claim 11 wherein the sensors are elastomeric force sensors.

13. The system of claim 11 wherein the force sensors are capacitive force sensors.

14. The system of claim 11 wherein the force sensors are force sensitive resistors.

15. The system of claim 6 wherein the total force is measured only when the stylus tip is pressing on the surface.

16. The system of claim 6 wherein the direction of the force is measured only when the stylus tip is pressing on the surface.

17. A system for measuring the magnitude and direction of a force applied to a stylus tip to a surface, comprising:
   a stylus tip mounted to a first plate;
   a second plate firmly mounted to the body of the stylus;
   two or more force sensors floatingly connecting the first plate to the second plate; and
   a sensor module for determining the total force applied to the stylus tip from the surface and the direction of the force applied to the stylus tip from the surface from measurements received from the two or more force sensors.

18. The system of claim 17, wherein the sensor module determines the total force applied to the stylus tip as the sum of the forces measured from the force sensors.

19. The system of claim 16, wherein the sensor module determines the direction of the force applied to the stylus tip from the surface from the relative values measured by the force sensors.

20. The system of claim 16, further comprising an application to use the determined total force and direction of the force applied to the stylus tip to control the output of the stylus.

* * * * *